E. B. BAYLISS.
BUTTON LINK OR FASTENER.
APPLICATION FILED JULY 21, 1908.
926,383.
Patented June 29, 1909.
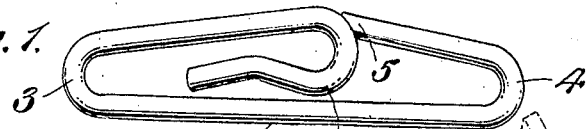
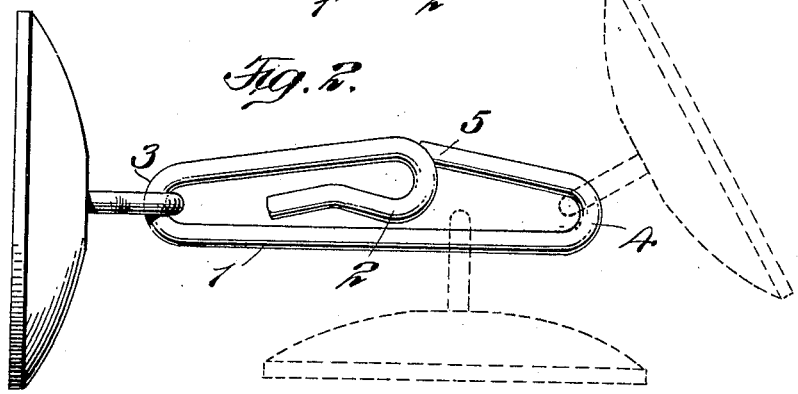
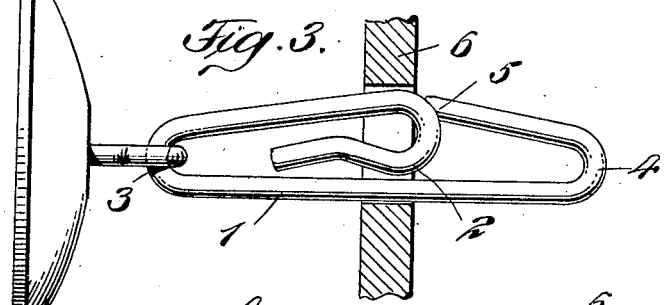
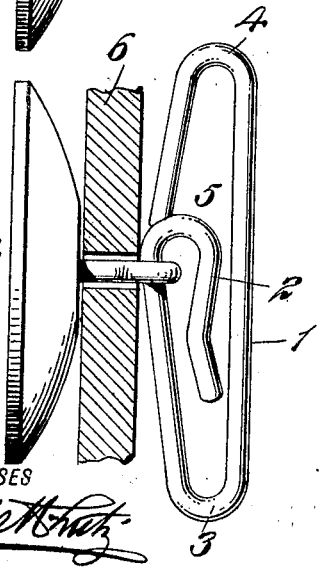
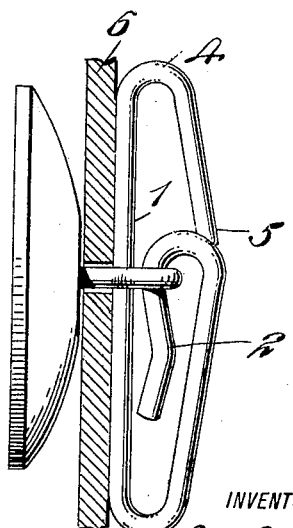
WITNESSES
INVENTOR
E. B. Bayliss,
BY
ATTORNEY

UNITED STATES PATENT OFFICE.

EDWARD B. BAYLISS, OF DAYTON, OHIO.

BUTTON LINK OR FASTENER.

No. 926,383.　　　　Specification of Letters Patent.　　　Patented June 29, 1909.

Application filed July 21, 1908. Serial No. 444,675.

*To all whom it may concern:*

Be it known that I, EDWARD B. BAYLISS, a citizen of the United States, residing at Dayton, in the county of Montgomery and State of Ohio, have invented certain new and useful Improvements in Button Links or Fasteners, of which the following, in connection with the accompanying drawings and the reference characters marked thereon, is a full, clear, and exact specification.

This invention has relation to that class of links or fasteners which are applied to the shanks of buttons and intended to be passed through eyelets or button-holes and then adjusted in the shanks so as to removably secure the buttons in place for use or ornament. Heretofore in this class of devices the link or fastener has been made of such form as to interfere with its ready insertion in and removal from the eyelet or other opening in the garment or fabric, the exterior having one or more protuberances which not only destroyed the exterior smoothness and symmetrical appearance of the link but constituted an obstruction or obstructions against the passage of the link in either direction through the opening provided for it. The exterior protuberances were intended to form recesses for receiving the shank of the button, and, after the latter was finally located in place, they found lodgment in the opening in the fabric and therefore failed to hold the button shank properly seated in the opening.

The principal object of my invention is to provide or produce a simple, cheap and efficient link or fastener for the shank of buttons and the like, which link or fastener shall have a continuously smooth or unbroken exterior and wherein the recess for the reception of the button shank in its fastened position shall be located wholly inside the link or between the two longer margins thereof.

A subordinate object is to so construct the recess for fastening the button shank that the wall of the recess may be sprung upon the button shank without difficulty or inconvenience and the fastener securely maintained upon the shank and in proper relation to the button. And a still further object is to so construct the adjustable link or fastener that it will not (when in place for holding it) permit the button shank to draw back through the opening.

To accomplish all of the foregoing objects and to secure other and further advantages in the matters of construction, operation and use, my improvements involve certain new and useful peculiarities of construction and relative arrangements or combinations of parts as will be first fully described and then pointed out in the claims.

In the accompanying drawings forming part of this specification, Figure 1 is a side view showing my improved button link or fastener complete and ready for application but detached from the button. Fig. 2 is a side elevation showing the link or fastener having a button thereon, progressive positions of the button being indicated by dotted lines. Fig. 3 is a section and elevation showing the manner of introducing the link or fastener into an eyelet or other opening in a garment or fabric; and Fig. 4 is a similar view showing the link or fastener shifted to a position to hold the button in its proper place after its shank has been passed through the opening. Fig. 5 is a view similar to Fig. 4, but showing the opposite side of the fastener turned toward the button shank and engaged with the eye thereof.

In these several figures like reference characters, wherever they are employed, indicate corresponding parts.

The improved link or fastener, which may be of any desired size, is preferably made of a continuous, round wire of sufficient resiliency, represented at 1; and according to my most approved form of construction, this wire is bent into the general elongated shape indicated in the various figures. One end or small portion of the wire, as at 2, called a loop, constitutes a recess for reception of the button shank when the latter is locked in place. From the part 2 the material is continued to one end of the link, 3, thence more or less directly to the point 4 where it is turned back and terminates at 5 upon or in close proximity to the adjacent portion of the loop 2. By this formation, it will be observed that the exterior of the link or fastener is entirely smooth and without projections or obstructions to interfere with its free insertion into and passage through an eyelet or other opening in a garment or fabric, which opening is usually comparatively small.

The link is applied in the eye of the button shank by springing the latter between the end 5 and the adjacent portion of the wire. Then the button or the link may be moved until the shank reaches one or the other of the ends of the link, when the link is ready for insertion. The ends of the link being similar, either one may be forced through the opening in the garment or fabric, 6, as in Fig. 3. After the button is finally located, as in Figs. 4 and 5, the link or fastener is shifted so as to spring upon the shank and confine the latter in the recess provided by the loop 2, which is about midway between the ends. When in this position the link is usually turned flat against the inner surface of the garment or fabric 6, or, it is automatically so turned by use of the garment. The eye of the button shank may be entered in the recess as in Fig. 4, embracing then only the side of the fastener; or, it may be entered as in Fig. 5, thus being made to embrace the other side of the fastener as also a portion of the loop. Thus it will be seen that the fastener may be locked with either side turned toward the button shank, the end of the loop forming a tongue which is bent to form a flared open mouth so as to permit the eye of the button shank to move between it and the side of the fastener or to guide the eye into the recess.

To detach the button, the fastener has only to be shifted so as to spring the button shank out of its recess and moved to a position in prolongation of the shank, when it may be easily forced back through the opening in the fabric or garment or pulled therethrough by grasping the button, as will be readily understood.

The ends of the link are sufficiently sharp to be easily started in the opening or eyelet, and, being rounded and smooth, they are not so sharp as to injure the finger or catch in the goods. Being made of spring metal, the link may be forced through a contracted opening and will thereafter immediately return to its normal condition.

The loop forming the holding recess for the button shank being located entirely between the side portions of the link and in the same plane therewith and nowhere projecting beyond them, adds nothing to the width of the fastener and is not liable to become caught or entangled with any portion of the goods.

When in its fastened position, as in Figs. 4 or 5, the button shank is prevented by the fastener from being drawn back through the eyelet or opening, so the button is held in its proper relation to the goods.

While I have represented my improved device in the simplest and best form known to me, it should be understood that the material of the link might be otherwise bent so as to leave the exterior entirely smooth or unbroken and still bring the recess or loop for confining the button shank between the two side portions of the link without departing from the principle of my invention.

Being constructed and arranged substantially in accordance with the foregoing explanations, the improved device is found to answer all the purposes or objects of the invention herein before alluded to.

Having now fully described my invention, what I claim as new herein and desire to secure by Letters Patent, is:

1. In button links or fasteners, an elongated fastener comprising unobstructed side and end portions and a spring portion forming a shank-holding recess, said spring portion being located between the unobstructed side and end portions and in the same plane therewith, for the objects set forth.

2. In button links or fasteners, an elongated fastener of bent resilient material comprising similar unobstructed side portions, similar end portions, and a spring loop forming a shank-holding recess, said loop being located between the unobstructed side and end portions and in the same plane therewith and being bent at its inner end to form a flared mouth for said loop, for the objects explained.

3. In button links or fasteners, the combination with a button having an eye in its shank, of an elongated fastener comprising similar unobstructed side and end portions, and an open spring loop forming a recess for receiving the eye of the button shank, said loop being located between the side portions and between the end portions of the fastener and in the same plane therewith, said fastener being arranged to be inserted or removed either end first, to be adjusted on the button shank, and to hold the latter in place, substantially as specified.

4. In button links or fasteners, the combination with a button having an eye in its shank, of an elongated fastener comprising similar unobstructed side portions, and an open spring loop forming a recess for receiving the eye of the button shank, said loop being located between the side portions and between the end portions of the fastener and in the same plane therewith, said fastener being arranged to be finally located in the eye of the shank with either side turned toward the shank, substantially as specified.

5. In button links or fasteners, a fastener as herein described composed of continuous, resilient wire bent to form similar uninterrupted side portions, similar end portions, and an open loop formed at one end of the wire and lying between the side portions, the extremity of this end portion of the wire being bent to form a flared mouth for said loop, the other end portion of the wire terminating between the ends of the fastener and in proximity to the initial bend of said loop.

EDWARD B. BAYLISS.

Witnesses:
WORTH OSGOOD,
L. H. OSGOOD.